(12) United States Patent
Yaguchi (10) Patent No.: US 7,629,755 B2
(45) Date of Patent: Dec. 8, 2009

(54) SECONDARY BATTERY CONTROL APPARATUS AND SECONDARY BATTERY CONTROL METHOD

(75) Inventor: Hideaki Yaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 25 days.

(21) Appl. No.: 11/884,469

(22) PCT Filed: Jul. 11, 2006

(86) PCT No.: PCT/JP2006/014139

§ 371 (c)(1),
(2), (4) Date: Aug. 16, 2007

(87) PCT Pub. No.: WO2007/007900

PCT Pub. Date: Jan. 18, 2007

(65) Prior Publication Data

US 2008/0143281 A1    Jun. 19, 2008

(30) Foreign Application Priority Data

Jul. 12, 2005    (JP) ............................. 2005-202931

(51) Int. Cl.
 *H02P 1/00* (2006.01)
(52) U.S. Cl. ................... 318/139; 318/471; 318/782
(58) Field of Classification Search ............... 318/139, 318/471, 782, 599, 722, 811; 388/934; 320/132, 320/150
See application file for complete search history.

(56) References Cited

U.S. PATENT DOCUMENTS 4,632,303 A * 12/1986 Rodittis ................. 236/10

2003/0057914 A1    3/2003    Kamatsu et al.

FOREIGN PATENT DOCUMENTS

| JP | A 8-191546 | 7/1996 |
|---|---|---|
| JP | A 9-275696 | 10/1997 |
| JP | A 11-159467 | 6/1999 |
| JP | A 2000-92614 | 3/2000 |
| JP | A 2001-197607 | 7/2001 |
| JP | A 2001-268715 | 9/2001 |
| JP | A 2003-32804 | 1/2003 |
| JP | A 2003-272712 | 9/2003 |

(Continued)

Primary Examiner—Karen Masih
(74) Attorney, Agent, or Firm—Oliff & Berridge, PLC (57) ABSTRACT

When it is determined that a battery temperature is lower than a threshold value, an inverter control circuit alternately switches an operation point of an AC motor between an optimum operation point and a motor loss increase point. At the motor loss increase point, an increase in the amplitude of the motor current increases copper loss occurring in the three-phase coil of the AC motor. On the other hand, at the optimum operation point, a reduction in the amplitude of the motor current reduces copper loss. Corresponding to the cyclical increase/reduction in the copper loss, the battery is cyclically charged/discharged by the electric power corresponding to the copper loss. The change in the battery current occurred by the charge/discharge causes the internal resistance to generate heat, whereby the temperature of the battery is increased. The foregoing temperature increase operation is prohibited when the motor temperature exceeds an allowable temperature with which the operation efficiency of the AC motor is ensured.

14 Claims, 7 Drawing Sheets

FOREIGN PATENT DOCUMENTS

| | | |
|---|---|---|
| JP | A 2003-274565 | 9/2003 |
| JP | A 2004-15866 | 1/2004 |
| JP | A 2005-20854 | 1/2005 |
| JP | A 2005-176484 | 6/2005 |
| WO | WO 02/065628 A1 | 8/2002 |

* cited by examiner

SECONDARY BATTERY CONTROL APPARATUS AND SECONDARY BATTERY CONTROL METHOD

TECHNICAL FIELD

The present invention relates to a secondary battery control apparatus and a secondary battery control method capable of quickly increasing the temperature of a secondary battery.

BACKGROUND ART

Normally, in a vehicle such as an electric vehicle (EV) or a hybrid vehicle (HV), the drive force based on electric energy is obtained by converting direct-current (DC) power supplied from a battery of high voltage to three-phase alternating-current (AC) power by an inverter, and rotating a three-phase AC motor with the three-phase AC power. In deceleration of the vehicle, conversely the regenerative energy obtained by regeneration of the three-phase AC motor is stored in the battery. Thus, the vehicle runs, making full use of the energy.

In such a hybrid or electric vehicle, the power generation of the generator driven by the engine is controlled such that the state of charge (SOC) indicating the charged quantity of a battery is maintained in a prescribed range. A secondary battery such as a nickel metal hydride battery, lithium ion battery and the like is employed as the battery. Since such a secondary battery is involved in the driving of the vehicle, its high reliability is required.

On the other hand, it is known that the performance of a secondary battery significantly varies depending on its temperature. Among others, the power that can be input to or output from the battery may be greatly decisive for the running performance of the vehicle. The power that can be input to or output from the battery is significantly reduced as the battery temperature is reduced. Accordingly, there has been a problem that, in cold climates or the like, a desired output cannot be obtained in starting the vehicle or in assisting the engine output due to the low battery temperature, and the vehicle cannot be smoothly started or accelerated.

One strategy for the problem may be to use a heater apparatus to increase the battery temperature when the battery temperature is lower than a prescribed temperature. On the other hand, the strategy leaves many problems unsolved. That is, additional components such as the heater apparatus increase size of the vehicle and manufacturing costs. In terms of the energy efficiency, a part of heat generated by the heater apparatus escapes to parts other than the battery.

Therefore, recently, many battery control apparatuses have been disclosed, which efficiently increase the battery temperature to suppress reduction in the power that can be input to or output from the battery, in order to ensure the running performance of the vehicle (for example, see Japanese Patent Laying-Open No. 2003-272712, Japanese Patent Laying-Open No. 2003-274565, Japanese Patent Laying-Open No. 2000-092614, and Japanese Patent Laying-Open No. 2004-015866).

For example, Japanese Patent Laying-Open No. 2003-272712 discloses a battery control apparatus characterized by repeated charging and discharging of a battery in a prescribed range of the state of charge (SOC) of the battery, when the temperature of the battery is equal to or lower than a prescribed value.

The battery control apparatus disclosed therein includes: battery temperature detecting means for detecting a temperature of a battery; state-of-charge determining means for determining a state of charge (SOC) of the battery; and battery control means for controlling charge-discharge of the battery. When the temperature of the battery is equal to or lower than a prescribed value, the battery control means repeatedly and alternately charges and discharges the battery in short cycles in a prescribed range of SOC. Here, the battery control means causes an internal resistance of the battery to generate heat by a current passing through the battery (the battery current) during charge or discharge so that the battery temperature is directly increased from the inside. Accordingly, the temperature can effectively be increased without a power loss, as compared to the case where the battery temperature is increased using a heater apparatus.

Further, the battery control apparatus of Japanese Patent Laying-Open No. 2003-272712 as incorporated in a hybrid vehicle controls charging and discharging of a battery in a temperature increase mode, in accordance with the running state of the vehicle.

Specifically, in the running state of the vehicle, the battery control means executes the battery discharge control by prohibiting driving of a generator for compensating for the battery consumption associated with running of the vehicle (the generation for driving) and regenerative braking of a motor for driving, in a prescribed range of SOC, so that charging of the battery is stopped. It executes the battery charge control by permitting the generation for driving and the regenerative braking so that charging of the battery is started. That is, while the vehicle is running, the battery means executes battery charge and discharge control by prohibiting/permitting driving of the generator by the engine and the regenerative braking of the motor for driving.

In the stop state of the vehicle, the battery control means executes the battery charge control by starting the engine to forcibly drive the generator.

As described above, the battery control apparatus of Japanese Patent Laying-Open No. 2003-272712 prohibits/permits driving of the generator and the motor for driving, or forcibly drives the generator, depending on the state of the vehicle, to thereby control the charging and discharging of the battery to increase the temperature thereof. This invites such a problem that the cycles in which the battery is actually charged or discharged is dependent on the running state of the vehicle, and therefore the battery temperature can hardly be quickly increased. In particular, in a lithium ion battery, the temperature is not easily increased since the internal resistance at low temperatures is lower than the internal resistance at the normal temperature. Therefore, an improvement in the efficiency of increasing the temperature has been required.

Further, prohibition/permission of the generation for driving and the regenerative braking is executed by the battery control unit outputting an instruction for stopping the generation/an instruction for starting the generation to an auxiliary control unit, and by the battery control unit transferring a signal for suppressing torque during the regeneration to a motor control unit via a torque control unit. This complicates the battery charge/discharge control in the temperature increase mode.

Accordingly, the present invention has been made to solve the problems described above, and an object thereof is to provide a secondary battery control apparatus and a secondary battery control method capable of quickly and easily increasing the temperature of the secondary battery.

DISCLOSURE OF THE INVENTION

According to the present invention, an apparatus for controlling a secondary battery includes: a motor driving circuit receiving supply of electric power from a secondary battery to drive a motor; battery temperature obtaining means for detecting or estimating a battery temperature of the secondary battery; and a control circuit controlling the motor driving circuit such that output torque of the motor conforms to requested torque. The control circuit includes first control means for operating the motor at a first operation point that requires a motor driving current of a first current amplitude for generating the requested torque, second control means for operating the motor at a second operation point that requires a motor driving current of a second current amplitude greater than the first current amplitude for generating the requested torque, and switching means for alternately switching between the first control means and the second control means for execution, when the battery temperature is lower than a prescribed threshold temperature.

According to the apparatus for controlling a secondary battery, by alternately switching between great and small amplitudes of a motor driving current, energy loss of the motor is cyclically increased and reduced. As the electric power corresponding to the change in the energy loss is intentionally repeatedly input to and output from the secondary battery, the current that passes when the battery is charged/discharged allows the temperature of the secondary battery to be quickly and easily increased. The output torque can be maintained at a constant value even when the temperature increase operation of the secondary battery is executed.

Preferably, the first control means exerts feedback control of the motor driving current using a first current instruction that is constituted of the first current amplitude and a first current phase and that provides the first operation point. The second control means exerts feedback control of the motor driving current using a second current instruction that is constituted of the second current amplitude and a second current phase and that provides the second operation point. The switching means alternately switches between the first current instruction and the second current instruction in the feedback control of the motor driving current.

According to the apparatus for controlling the secondary battery, by cyclically switching between the current instructions used for feedback control of the motor driving current, the motor control means can easily be switched.

Preferably, the apparatus for controlling the secondary battery further includes motor temperature obtaining means for obtaining a motor temperature of the motor. The control circuit prohibits execution of the switching means in response to the motor temperature becoming at least a prescribed allowable temperature.

According to the apparatus for controlling the secondary battery, an excessive increase in the motor temperature due to the execution of the temperature increasing operation of the secondary battery can be suppressed, whereby deterioration in the operation efficiency of the motor can be prevented.

Preferably, the control circuit further includes setting means for setting the second current amplitude such that electric power supplied from the secondary battery to the motor driving circuit does not exceed electric power that can be output from the secondary battery, when the motor is operated at the second operation point.

According to the apparatus for controlling the secondary battery, the temperature of the secondary battery can quickly be increased while the secondary battery is protected from being excessively discharged.

Preferably, the setting means sets the second current amplitude based on a relationship, obtained in advance, between the battery temperature and electric power that can be output from the secondary battery and in accordance with electric power that can be output from the secondary battery that corresponds to the battery temperature.

According to the apparatus for controlling the secondary battery, since the temperature increase operation of the secondary battery is executed based on the electric power that can be output from the secondary battery changing in accordance with the battery temperature, the temperature of the secondary battery can quickly be increased while protection of the secondary battery is ensured.

Preferably, the control circuit further includes setting means for setting a plurality of the second current amplitudes so as to be each greater than the first current amplitude and to be each gradually increased.

According to the apparatus for controlling the secondary battery, a sharp change in the operation efficiency of the motor when the temperature increase operation of the secondary battery is executed can be suppressed.

Preferably, the first operation point includes an optimum operation point where a maximum value of output torque in the first current amplitude is the requested torque. The control circuit exerts feedback control of the motor driving current using the first current instruction providing the optimum operation point, in response to the battery temperature becoming at least the threshold temperature.

According to the apparatus for controlling the secondary battery, when the battery temperature of at least a threshold temperature is ensured, the control can easily move to the motor control with which high motor efficiency can be obtained.

Preferably, the motor includes a motor for driving that drives driving wheels of a vehicle.

According to the apparatus for controlling the secondary battery, drivability can be ensured since a change in the output torque of the motor for driving is suppressed regardless of the execution of the temperature increase operation.

Another aspect of the present invention provides a method of controlling a secondary battery supplying electric power to a motor driving circuit driving a motor. The method includes: a battery temperature obtaining step of detecting or estimating a battery temperature of the secondary battery; and a driving control step of controlling the motor driving circuit such that output torque of the motor conforms to requested torque. The driving control step includes a first control step of operating the motor at a first operation point that requires a motor driving current of a first current amplitude for generating the requested torque, a second control step of operating the motor at a second operation point that requires a motor driving current of a second current amplitude greater than the first current amplitude for generating the requested torque, and a switching step of switching between the first control step and the second control step for execution, when the battery temperature is lower than a prescribed threshold temperature.

According to the method of controlling a secondary battery, as the cyclically changing energy loss of the motor is intentionally repeatedly input to and output from the secondary battery, the temperature of the secondary battery can quickly and easily be increased. The output torque can be maintained at a constant value even when the temperature increase operation of the secondary battery is executed.

Preferably, the first control step includes a step of exerting feedback control of the motor driving current using a first current instruction that is constituted of the first current amplitude and a first current phase and that provides the first operation point. The second control step includes a step of exerting feedback control of the motor driving current using a second current instruction that is constituted of the second current amplitude and a second current phase and that provides the second operation point. The switching steps includes a step of alternately switching between the first current instruction and the second current instruction in the feedback control of the motor driving current.

According to the method of controlling the secondary battery, by cyclically switching between the current instructions used for feedback control of the motor driving current, the motor control means can easily be switched.

Preferably, the method of controlling the secondary battery further includes a motor temperature obtaining step of obtaining a motor temperature of the motor. The driving control step prohibits execution of the switching step in response to the motor temperature becoming at least a prescribed allowable temperature.

According to the method of controlling the secondary battery, an excessive increase in the motor temperature due to the execution of the temperature increasing operation of the secondary battery can be suppressed, whereby deterioration in the operation efficiency of the motor can be prevented.

Preferably, the driving control step further includes a setting step of setting the second current amplitude such that electric power supplied from the secondary battery to the motor driving circuit does not exceed electric power that can be output from the secondary battery, when the motor is operated at the second operation point.

According to the method of controlling the secondary battery, the temperature of the secondary battery can quickly be increased while the secondary battery is protected from being excessively discharged.

Preferably, the setting step sets the second current amplitude based on a relationship, obtained in advance, between the battery temperature and electric power that can be output from the secondary battery and in accordance with electric power that can be output from the secondary battery that corresponds to the battery temperature.

According to the method of controlling the secondary battery, since the temperature increase operation of the secondary battery is executed based on the electric power that can be output from the secondary battery changing in accordance with the battery temperature, the temperature of the secondary battery can quickly be increased while protection of the secondary battery is ensured.

Preferably, the first operation point includes an optimum operation point where a maximum value of output torque in the first current amplitude is the requested torque. The driving control step exerts feedback control of the motor driving current using the first current instruction providing the optimum operation point, in response to the battery temperature becoming at least the threshold temperature.

According to the method of controlling the secondary battery, when the battery temperature of at least a threshold temperature is ensured, the control can easily move to the motor control with which high motor efficiency can be obtained.

Preferably, the motor includes a motor for driving that drives driving wheels of a vehicle.

According to the method of controlling the secondary battery, drivability can be ensured since a change in the output torque of the motor for driving is suppressed regardless of the execution of the temperature increase operation.

According to the present invention, the electric power corresponding to the change in the energy loss is intentionally repeatedly input to and output from the secondary battery, whereby the current that passes when the battery is charged/discharged allows the temperature of the secondary battery to be quickly and easily increased.

BEST MODES FOR CARRYING OUT THE INVENTION

In the following, an embodiment of the present invention will be described in detail referring to the drawings. The same or corresponding parts are denoted by the same reference characters.

Figure 1:
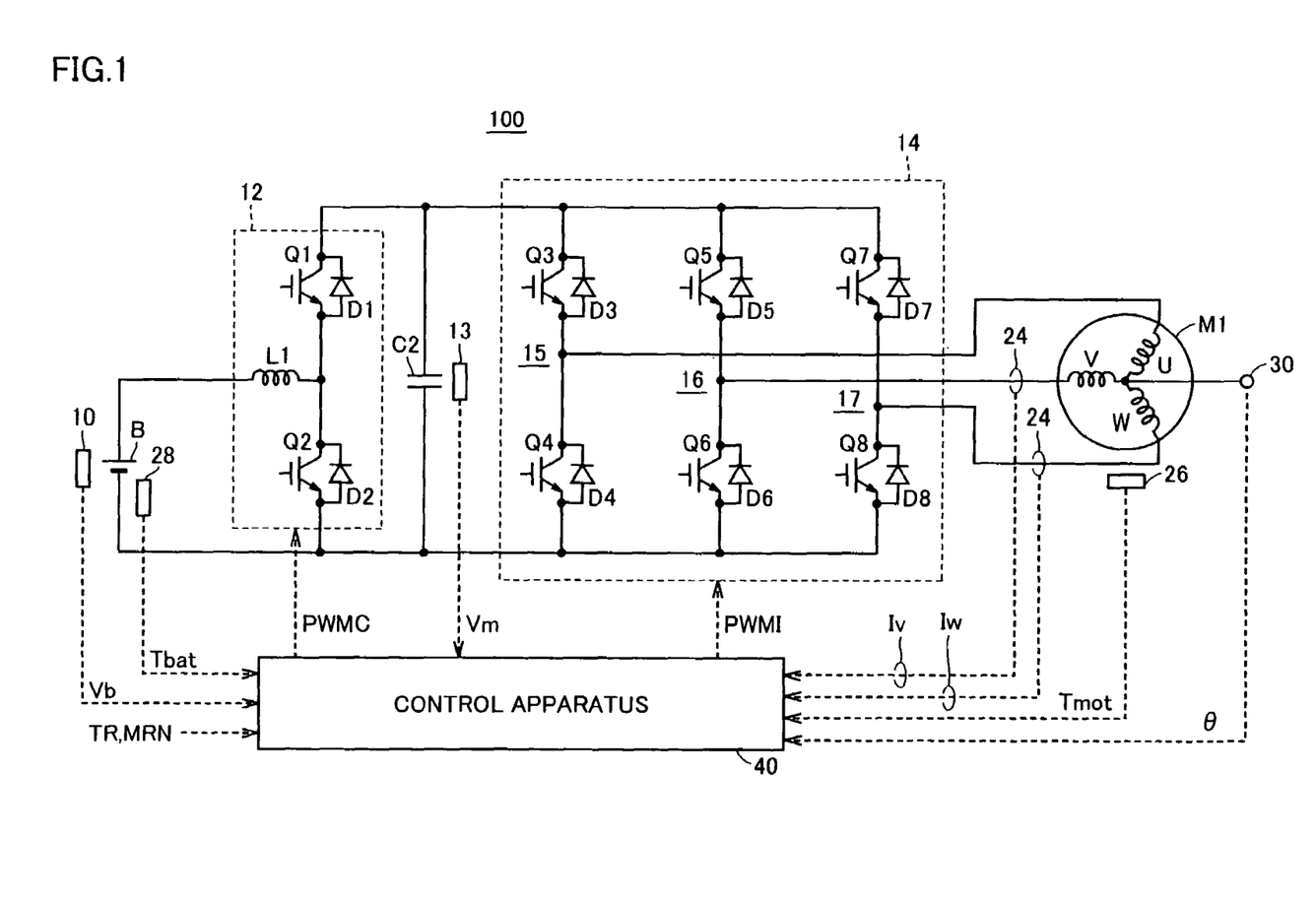
FIG. 1 is a schematic block diagram of a motor drive apparatus provided with a secondary battery control apparatus according to an embodiment of the present invention.

FIG. 1 is a schematic block diagram of a motor drive apparatus provided with a secondary battery control apparatus according to an embodiment of the present invention.

Referring to FIG. 1, a motor drive apparatus 100 includes a battery B, voltage sensors 10 and 13, a current sensor 24, temperature sensors 26 and 28, a capacitor C2, a boost converter 12, an inverter 14, a resolver 30, and a control apparatus 40.

An AC motor M1 is a drive motor for producing torque for driving the driving wheels of a hybrid or electric vehicle. Further, AC motor M1 serves as a generator driven by the engine, and also operates as a motor to the engine, being capable of starting the engine, for example.

Boost converter 12 includes a reactor L1, NPN transistors Q1 and Q2, and diodes D1 and D2.

One end of reactor L1 is connected to the power supply line of battery B, and the other end thereof is connected to an intermediate point between NPN transistor Q1 and NPN transistor Q2, namely, between the emitter of NPN transistor Q1 and the collector of NPN transistor Q2.

NPN transistors Q1 and Q2 are serially connected between the power supply line and the earth line. The collector of NPN transistor Q1 is connected to the power supply line, and the emitter of NPN transistor Q2 is connected to the earth line. Between collectors and emitters of NPN transistors Q1 and Q2, diodes D1 and D2 passing current from the emitter side to the collector side are arranged, respectively.

Inverter 14 is formed with a U phase arm 15, a V phase arm 16, and a W phase arm 17. U phase arm 15, V phase arm 16, and W phase arm 17 are provided in parallel between the power supply line and the earth line.

U phase arm 15 is formed with serially connected NPN transistors Q3 and Q4. V phase arm 16 is formed with serially connected NPN transistors Q5 and Q6. W phase arm 17 is formed with serially connected NPN transistors Q7 and Q8. Between the collectors and the emitters of NPN transistors Q3-Q8, diodes D3-D8 for passing current from the emitter side to the collector side are connected, respectively.

The intermediate point of each phase arm is connected to each phase end of each phase coil of AC motor M1. Specifically, AC motor M1 is a three-phase permanent magnet motor, in which each of one ends of three coils of U, V, W phases are all connected to the intermediate point. The other end of U phase coil is connected to the intermediate point of NPN transistors Q3 and Q4. The other end of V phase coil is connected to the intermediate point of NPN transistors Q5 and Q6. The other end of W phase coil is connected to the intermediate point of NPN transistors Q7 and Q8.

The switching devices respectively included in boost converter 12 and inverter 14 are not limited to NPN transistors Q1-Q8, but they may be other power devices such as IGBTs (Insulated Gate Bipolar Transistors), MOSFETs and the like.

Battery B is formed with a secondary battery such as a Nickel-Metal Hydride battery and a lithium ion battery. Voltage sensor 10 detects a voltage Vb output from battery B, and outputs the detected voltage Vb to control apparatus 40.

Temperature sensor 28 detects a battery temperature Tbat of battery B, and outputs the detected battery temperature Tbat to control apparatus 40. Means for obtaining battery temperature Tbat is not limited to temperature sensor 28. Battery temperature Tbat may be estimated from an internal resistance value of battery B.

Boost converter 12 boosts the DC voltage supplied from battery B and supplies it to capacitor C2. More specifically, boost converter 12 receives a signal PWMC from control apparatus 40, and boosts the DC voltage in accordance with a period during which NPN transistor Q2 is turned on by signal PWMC, and supplies the boosted voltage to capacitor C2.

When boost converter 12 receives signal PWMC from control apparatus 40, it decreases DC voltage supplied from inverter 14 via capacitor C2 and supplies the decreased voltage to battery B.

Capacitor C2 smoothes the DC voltage output from boost converter 12, and supplies the smoothed DC voltage to inverter 14.

Voltage sensor 13 detects voltage Vm between opposing ends of capacitor C2 (corresponding to an input voltage of inverter 14: the same holds true for the following), and outputs the detected output voltage Vm to control apparatus 40.

When supplied with the DC voltage from capacitor C2, inverter 14 converts the DC voltage to an AC voltage based on a signal PWMI from control apparatus 40 to drive AC motor M1. Thus, AC motor M1 is driven to produce the requested torque specified by a torque instruction value TR.

Further, at the regenerative braking of the hybrid or electric vehicle incorporating motor drive apparatus 100, inverter 14 converts an AC voltage generated by AC motor M1 to a DC voltage based on a signal PWMI from control apparatus 40, and supplies the converted DC voltage to boost converter 12 via capacitor C2.

As used herein, the regenerative braking includes a braking operation associated with the regeneration of electricity where the driver of the hybrid vehicle operates a foot brake, or deceleration (or stopping acceleration) of the vehicle associated with regeneration of electricity where the driver does not operate the foot brake but turns an accelerator pedal off.

Current sensor 24 detects motor currents Iv and Iw passing through AC motor M1, and outputs the detected motor currents Iv and Iw to control apparatus 40. In FIG. 1, only two current sensors 24 are shown. This is because, when AC motor M1 is a three-phase motor, detection of motor currents Iv and Iw passing through two phases allows calculation of a motor current Iu passing through the other phase, based on the detected motor currents Iv and Iw. Therefore, if motor currents Iu, Iv, and Iw respectively passing through the three phases are to be detected independently, three current sensors 24 may be provided.

Temperature sensor 26 detects motor temperature Tmot of AC motor M1, and outputs the detected motor temperature Tmot to control apparatus 40.

Resolver 30 is attached to the rotation shaft of AC motor M1 to detect a rotary angle θ of the rotor of AC motor M1, and outputs the detected rotary angle θ to control apparatus 40.

Control apparatus 40 receives: a torque instruction value TR and a motor speed MRN from an externally provided ECU (Electrical Control Unit); an output voltage Vm from voltage sensor 13; a DC voltage Vb from voltage sensor 10; motor currents Iv and Iw from current sensor 24; and rotary angle θ from resolver 30. When inverter 14 drives AC motor M1, control apparatus 40 generates signal PWMI for switching-control NPN transistors Q3-Q8 of inverter 14, based on output voltage Vm, torque instruction value TR, motor currents Iv and Iw and rotary angle θ through a method described later, and outputs the generated signal PWMI to inverter 14.

Further, when inverter 14 drives AC motor M1, control apparatus 40 generates signal PWMC for switching-control NPN transistors Q1 and Q2 of boost converter 12 based on DC voltage Vb, output voltage Vm, torque instruction value TR, and motor speed MRN through a method described later, and outputs the generated signal PWMC to boost converter 12.

Further, in a regenerative braking mode of the hybrid or electric vehicle incorporating motor drive apparatus 100, control apparatus 40 generates signal PWMI for converting the AC voltage generated by AC motor M1 to DC voltage, based on output voltage Vm, torque instruction value TR, and motor currents Iv and Iw, and outputs the generated signal PWMI to inverter 14. In this case, NPN transistors Q3-Q8 of inverter 14 are switching-controlled by signal PWMI. Thus, inverter 14 converts the AC voltage generated by AC motor M1 to a DC voltage and supplies it to boost converter 12.

Further, in a regenerative braking mode, control apparatus 40 generates signal PWMC for reducing the DC voltage supplied from inverter 14, based on DC voltage Vb, output voltage Vm, torque instruction value TR, and motor speed MRN, and outputs the generated signal PWMC to boost converter 12. Thus, the AC voltage generated by AC motor M1 is converted to a DC voltage, reduced and supplied to battery B.

In motor drive apparatus 100 configured as above, the present invention is characterized in that control apparatus 40 further includes temperature increasing means for increasing the temperature of battery B. As will be described later, the temperature increasing means controls inverter 14 such that an energy loss of AC motor M1 is cyclically increased or decreased when temperature battery Tbat from temperature sensor 28 is lower than a prescribed threshold value Tc.

Since AC motor M1 is the motor for driving, the output torque must always satisfy the requested torque specified by torque instruction value TR.

Accordingly, control apparatus 40 controls inverter 14, such that, in an execution mode of temperature increasing means, the energy loss is cyclically increased/reduced while conforming the output torque of AC motor M1 to the requested torque.

Specifically, control apparatus 40 changes a current amplitude and a current phase of a motor current passing through AC motor M1 while maintaining the output torque at the requested torque. Here, if the current amplitude of the motor current is increased, in AC motor M1, among the energy loss, the copper loss caused by the motor current passing thorough the three-phase coil is increased. The electric power corresponding to the increase in the copper loss is additionally taken away from battery B. On the other hand, if the current amplitude of the motor current is reduced, the copper loss is reduced and the electric power corresponding to the reduction in the copper loss is brought into battery B.

Then, when the copper loss of AC motor cyclically changes by control apparatus 40 alternately and repeatedly increasing and reducing the current amplitude of the motor current, the electric power corresponding to the change in the copper loss is input to/output from battery B. Here, in battery B, the internal resistance generates heat in accordance with the change of DC current Ib associated with charge/discharge, whereby battery temperature Tbat is increased.

On the other hand, when the energy loss of AC motor M1 is increased by the execution of the temperature increasing means, AC motor M1 attains a high temperature state by the occurred copper loss. This affects the magnetic flux passing inside the motor and reduces the operation efficiency (rotation efficiency, generation efficiency).

In order to address this, control apparatus 40 prohibits the execution of the temperature increasing means when a motor temperature Tmot of AC motor M1 exceeds a prescribed allowable temperature Ta with which the motor performance is ensured, so that motor temperature Tmot is maintained at or lower than allowable temperature Ta.

Figure 2:
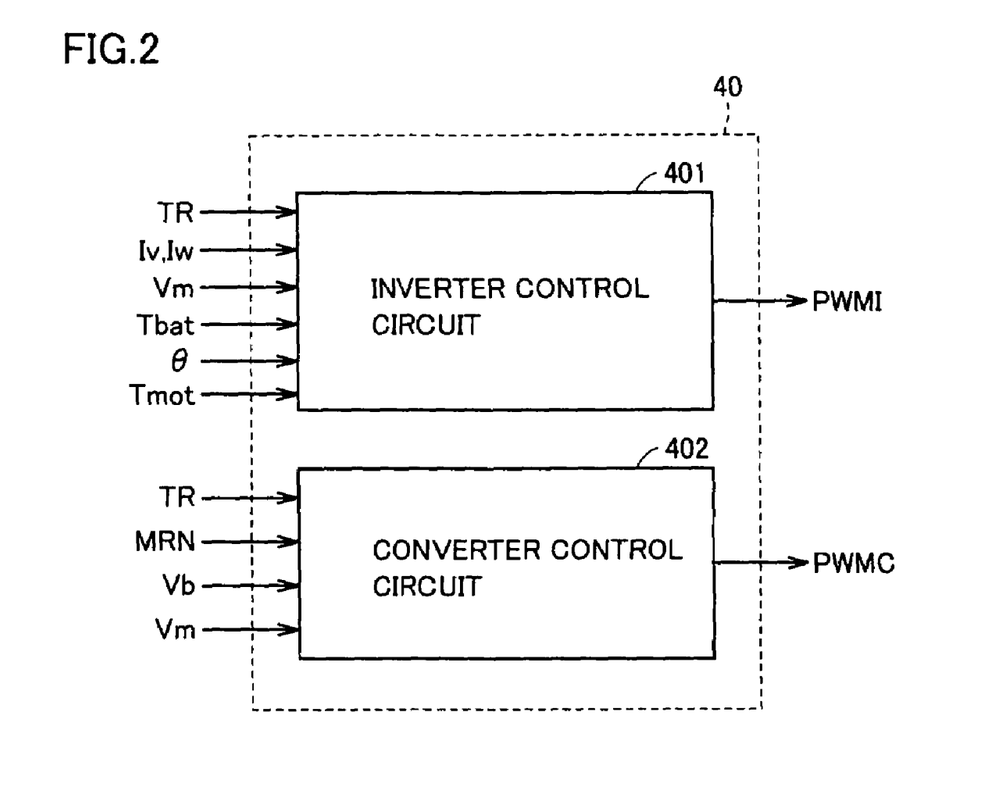
FIG. 2 is a functional block diagram of a control apparatus in FIG. 1.

FIG. 2 is a functional block diagram of control apparatus 40 in FIG. 1.

Referring to FIG. 2, control apparatus 40 includes an inverter control circuit 401 and a converter control circuit 402.

In a driving mode of AC motor M1, inverter control circuit 401 generates signal PWMI for turning on/off NPN transistors Q3-Q8 of inverter 14, based on torque instruction value TR, motor currents Iv and Iw, output voltage Vm, and rotary angle θ through a method described later, and outputs the generated signal PWMI to inverter 14.

In a regenerative braking mode of the hybrid or electric vehicle incorporating motor drive apparatus 100, inverter control circuit 401 generates signal PWMI for converting the AC voltage generated by AC motor M1 to a DC voltage, based on torque instruction value TR, motor currents Iv and Iw, output voltage Vm, and rotary angle θ, and outputs the generated signal PWMI to inverter 14.

Further, when battery temperature Tbat from temperature sensor 28 is lower than threshold value Tc, inverter control circuit 401 generates signal PWMI for cyclically increasing/reducing the energy loss of AC motor M1, through a method described later, and outputs the generated signal PWMI to inverter 14.

Following the increase/reduction in the energy loss, when the electric power corresponding to the energy loss is transferred between AC motor M1 and battery B, DC current Ib is oscillated in battery B in accordance with the change in the electric power charged/discharged. As a result, by the passage of oscillated DC current Ib, the internal resistance generates heat, whereby the temperature of battery B is increased.

Specifically, inverter control circuit 401 cyclically increases or reduces the energy loss of AC motor M1 so that DC current Ib passing through battery B is oscillated. Inverter control circuit 401 allows the internal resistance to generate heat by the oscillated DC current Ib so that the temperature of battery B is increased. Thus, inverter control circuit 401 implements the temperature increasing means of the present invention.

Inverter control circuit 401 prohibits execution of the temperature increasing means when it is determined that motor temperature Tmot from temperature sensor 26 exceeds prescribed allowable temperature Ta. Thus, AC motor M1 has its motor temperature Tmot maintained at or lower than allowable temperature Ta, thereby being capable of maintaining the operation efficiency.

In a driving mode of AC motor M1, converter control circuit 402 generates signal PWMC for turning on/off NPN transistors Q1 and Q2 of boost converter 12 based on torque instruction value TR, DC voltage Vb, output voltage Vm, and motor speed MRN, and outputs the generated signal PWMC to boost converter 12.

Further, in a regenerative braking mode of the hybrid or electric vehicle incorporating motor drive apparatus 100, converter control circuit 402 generates signal PWMC for reducing the DC voltage supplied from inverter 14, based on torque instruction value TR, DC voltage Vb, output voltage Vm, and motor speed MRN, and outputs the generated signal PWMC to boost converter 12.

Thus, boost converter 12 is also capable of reducing the voltage by signal PWMC for reducing the DC voltage, and therefore it has the function of a bidirectional converter.

Figure 3:
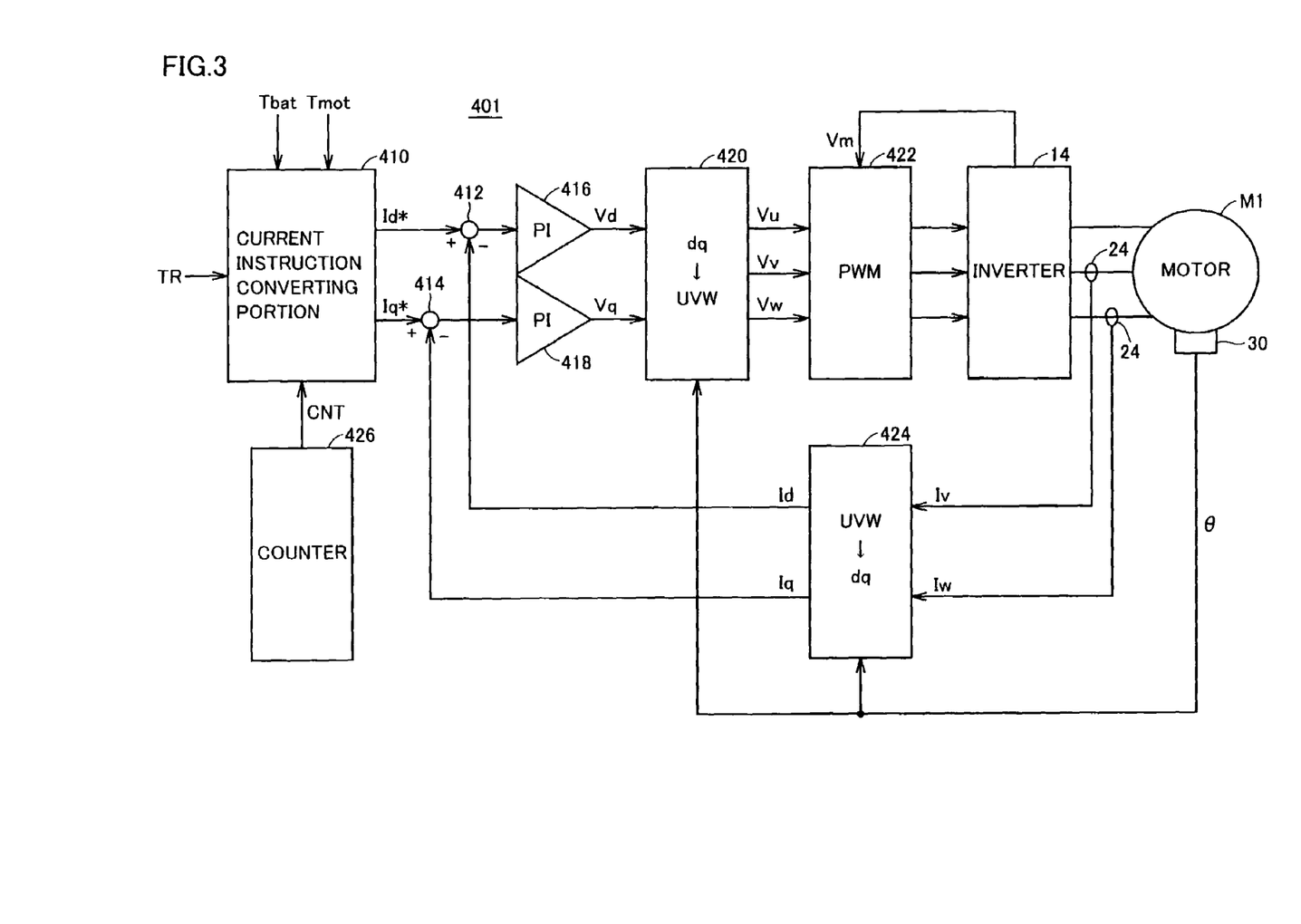
FIG. 3 is a functional block diagram of an inverter control circuit in FIG. 2.

FIG. 3 is a functional block diagram of inverter control circuit 401 in FIG. 2.

Referring to FIG. 3, inverter control circuit 401 includes a current instruction converting portion 410, subtractors 412 and 414, PI control portions 416 and 418, a two phase/three phase converting portion 420, a PWM generating portion 422, and a three phase/two phase converting portion 424.

Three phase/two phase converting portion 424 receives motor currents Iv and Iw from two current sensors 24 and 24. Based on motor currents Iv and Iw, three phase/two phase converting portion 424 calculates motor current Iu=−Iv−Iw.

Further, three phase/two phase converting portion 424 performs a three phase to two phase conversion of motor currents Iu, Iv and Iw using rotary angle θ from resolver 30. That is, three phase/two phase converting portion 424 converts three-phase motor currents Iu, Iv and Iw passing through respective phases of the three-phase coil of AC motor M1 to current values Id and Iq passing through d axis and q axis, using rotary angle θ. Then, three phase/two phase converting portion 424 outputs the calculated current value Id to subtractor 412 and outputs the calculated current value Iq to subtractor 414.

Current instruction converting portion 410 receives: torque instruction value TR and motor speed MRN from external ECU; voltage Vm from voltage sensor 13; battery temperature Tbat from temperature sensor 28; motor temperature Tmot from temperature sensor 26; and count value CNT from counter 426.

Then, when battery temperature Tbat is equal to or higher than threshold value Tc, current instruction converting portion 410 generates first current instructions Id(0) and Iq(0) for outputting the requested torque specified by torque instruction value TR based on torque instruction value TR, motor speed MRN and voltage Vm, and outputs the generated first current instructions Id(0) and Iq(0) to subtractors 412 and 414 as current instructions Id* and Iq*, respectively.

On the other hand, when battery temperature Tbat is lower than threshold value Tc, current instruction converting portion 410 generates two types of current instructions for outputting requested torque based on torque instruction value TR, motor speed MRN and voltage Vm. One of the generated two types of current instructions is the aforementioned first current instructions Id(0) and Iq(0), and the other is second current instructions Id(i) and Iq(i) being set to attain the current amplitude of the motor current greater than the first current instructions Id(0) and Iq(0).

Current instruction converting portion 410 alternately selects the generated first current instructions Id(0) and Iq(0) and second current instructions Id(i) and Iq(i) in accordance with count value CNT of counter 426, and outputs as current instructions Id* and Iq* to subtractors 412 and 414.

Counter 426 increments count value CNT for each control cycle T of inverter control circuit 401 and outputs it to current instruction converting portion 410. Current instruction converting portion 410 alternately selects the first and second current instructions every time count value CNT is incremented, that is, for each control cycle.

Subtractor 412 receives current instruction Id* from current instruction converting portion 410 and receives current value Id from three phase/two phase converting portion 424. Then, subtractor 412 calculates a deviation between current instruction Id* and current value Id (=Id*−Id), and outputs the calculated deviation to PI control portion 416. Subtractor 414 receives current instruction Iq* from current instruction converting portion 410 and receives current value Iq from three phase/two phase converting portion 432. Then, subtractor 414 calculates a deviation between current instruction Iq* and current value Iq (=Iq*−Iq), and outputs the calculated deviation to PI control portion 418.

PI control portions 416 and 418 use PI gain to deviations Id*−Id and Iq*−Iq to calculate voltage manipulation quantities Vd and Vq for adjusting motor currents, and outputs the calculated voltage manipulation quantities Vd and Vq respectively, to two phase/three phase converting portion 420.

Two phase/three phase converting portion 420 performs two phase/three phase conversion of voltage manipulation quantities Vd and Vq from PI control portions 416 and 418 using rotary angle θ from resolver 30. That is, two phase/three phase converting portion 420 converts voltage manipulation quantities Vd and Vq to be applied to d axis and q axis to voltage manipulation quantities Vu, Vv and Vw to be applied to three-phase coil of AC motor M1 using rotary angle θ. Then, two phase/three phase converting portion 420 outputs voltage manipulation quantities Vu, Vv and Vw to PWM generating portion 422.

PWM generating portion 422 generates signal PWMI based on voltage manipulation quantities Vu, Vv and Vw and voltage Vm from voltage sensor 13, and outputs the generated signal PWMI to inverter 14.

As described above, inverter control circuit 401 converts requested torque (corresponding to torque instruction valute TR) of AC motor M1 to current instructions Id* and Iq* of d axis component and q axis component of AC motor M1, and exerts feedback by means of PI control such that actual current values Id and Iq conform to the current instructions, i.e., what is called current control.

Further, when battery temperature Tbat is lower than threshold value Tc, inverter control circuit 401 exerts the current control while switching current instructions Id* and Iq* between the first current instructions and the second current instructions, for each control cycle. Thus, control of AC motor M1 is alternately switched between two control modes shown in FIG. 4, for each control cycle.

Figure 4:
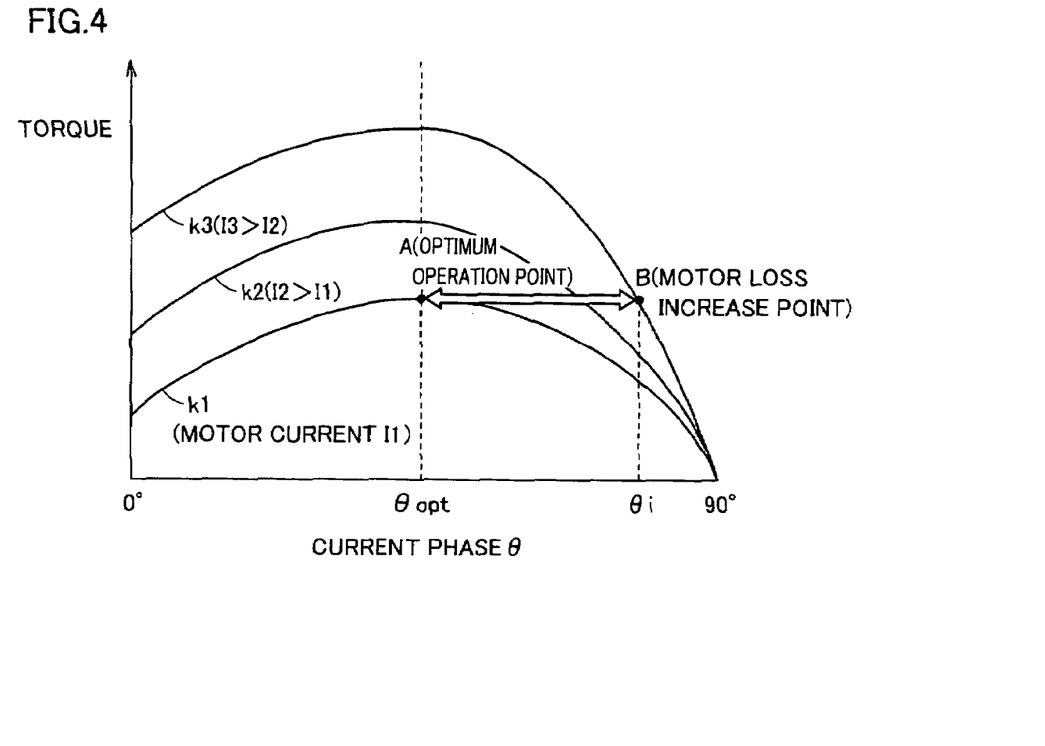
FIG. 4 is an illustration for showing control of an AC motor according to the present invention.

FIG. 4 is an illustration for showing control of AC motor M1 according to the present invention.

Referring to FIG. 4, the relationship between torque of AC motor M1 and current phase θ of a current passing through the motor is expressed by curves k1-k3. Curves k1-k3 are different from one another in the amplitude of the motor current, wherein curve k1 has the smallest amplitude (amplitude I1) and curve k3 has the greatest amplitude (amplitude I3 (>I2>I1)).

In each curve k1-k3, torque changes to be the greatest at a certain current phase θopt. That is, by passing a current through AC motor M1 at current phase θopt, the greatest torque is obtained. In the following, the control mode for changing current phase θ to obtain the greatest torque is also referred to as the greatest torque control mode. The operation point A of AC motor M1 where current phase θ=θopt is also referred to as the optimum operation point.

On the other hand, in each curve k1-k3, as current phase θ is gradually displaced from θopt where optimum operation point A is provided, torque is gradually reduced. That is, the displacement of current phase θ from θopt reduces the motor efficiency.

The present invention is characterized in including, in addition to the greatest torque control mode described above, a control mode of controlling AC motor M1 to increase the energy loss while maintaining constant output torque. In the following, the control mode increasing the energy loss with constant torque is also referred to as the loss increase control mode.

Specifically, as shown in FIG. 4, the loss increase control mode drives AC motor M1 at operation point B, where the current amplitude is current amplitude I3 being greater than current amplitude I1 at optimum operation point A, and the current phase is current phase θi being displaced from current phase θopt at optimum operation point A. As can be seen from FIG. 4, at operation point B, AC motor M1 outputs torque equivalent to the output torque at optimum operation point A. In the following, operation point B is also referred to as the motor loss increase point. Current phase θi at motor loss increase point B may be higher or lower than current phase θopt.

Inverter control circuit 401 alternately switches between these two controls modes (the maximum torque control mode and the loss increase control mode) for each control cycle. Thus, in AC motor M1, the current amplitude of a motor current is cyclically increased or reduced between amplitude I1 and amplitude I3. When AC motor M1 is driven at loss increase point B, copper loss ΔL occurring in the three-phase coil is increased because the current amplitude of the motor current is increased.

$$\Delta L = R \cdot I3^2 - R \cdot I1^2 \quad (1)$$

where R is a resistance component of the three-phase coil of AC motor M1.

On the other hand, when AC motor M1 is driven at optimum operation point A, copper loss ΔL in equation (1) is reduced. In response to copper loss ΔL being cyclically increased or reduced, electric power ΔP corresponding to copper loss ΔL is cyclically charged or discharged in battery B. Here, a current change expressed by the following equation occurs in DC current Ib passing through battery B.

$$\Delta Ib = \Delta P / Vb = (R \cdot I3^2 - R \cdot I1^2)/Vb \quad (2)$$

The passage of current change ΔIb through battery B generates heat quantity ΔQ expressed by equation (3) in the internal resistance (resistance value=Ri) of battery B. By this heat generation, battery temperature Tb of battery B is increased and the battery performance is improved.

$$\Delta Q = Ri \times \Delta Ib^2 \quad (3)$$

Here, switching of the control modes in inverter control circuit 401 is actually conducted by current instruction converting portion 410 alternately changing two current instructions.

Figure 5:
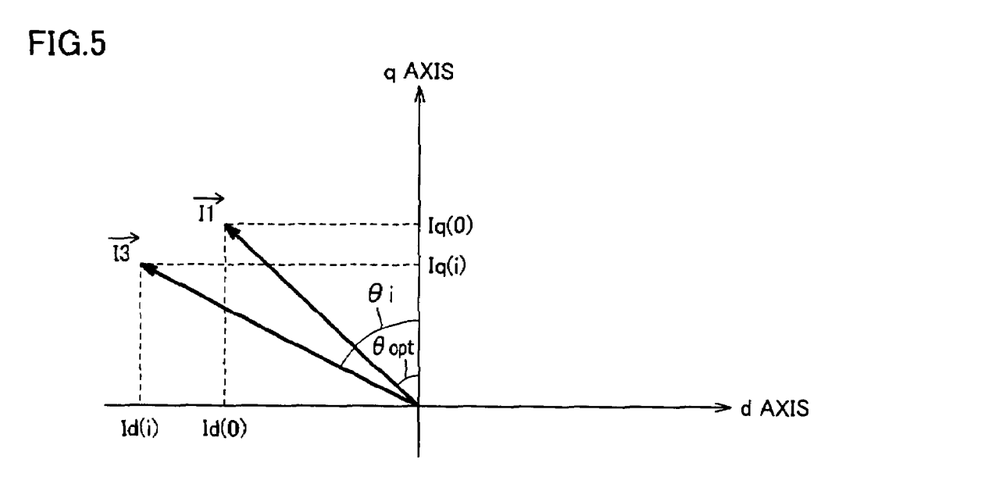
FIG. 5 is an illustration for showing an operation of switching between control modes performed by a current instruction converting portion in FIG. 3.

FIG. 5 is an illustration for showing an operation of switching the control modes performed by current instruction converting portion 410.

When AC motor M1 is driven as being switched alternately between two operation points A and B shown in FIG. 4, current converting portion 410 alternately switches between the two types of current instructions being set based on each operation point, and outputs them, as shown in FIG. 5.

Specifically, current instruction converting portion 410 sets first current instructions Id(0) and Iq(0) based on optimum operation point A. In the vector diagram of FIG. 5, Id(0) and Iq(0) correspond to d axis and q axis components of a motor current where current phase is θopt and current amplitude is I1.

Current instruction converting portion 410 also sets second current instructions Id(i) and Iq(i) based on motor loss increase point B. In the vector diagram of FIG. 5, Id(i) and Iq(i) correspond to d axis and q axis components of a motor current where current phase is θi and current amplitude is I3.

When battery temperature Tbat is lower than threshold value Tc, current instruction converting portion 410 outputs first current instructions Id(0) and Iq(0) and second current instructions Id(i) and Iq(i) alternately for each control cycle. Thus, AC motor M1 has its operation point alternately switched between optimum operation point A and motor loss increase point B, whereby the maximum torque control mode and the loss increase control mode are alternately executed.

On the other hand, when battery temperature Tbat is equal to or higher than threshold value Tc, current instruction converting portion 410 outputs current instructions Id* and Iq* as fixed to first current instructions Id(0) and Iq(0). Accordingly, MC motor M1 operates at optimum operation point A.

Figure 6:
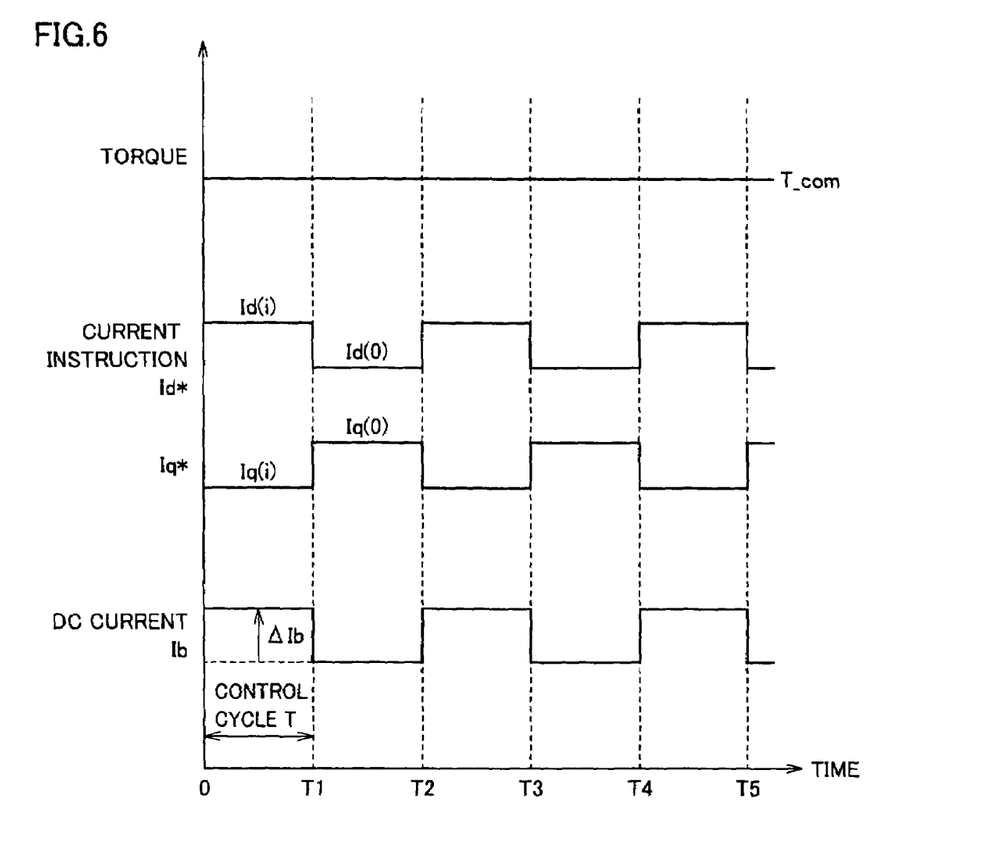
FIG. 6 is a timing chart indicative of the relationship between current instructions and a DC current passing through a battery.

FIG. 6 is a timing chart indicative of the relationship between current instructions Id* and Iq* and DC current Ib passing through battery B.

Referring to FIG. 6, as current instructions Id* and Iq* are switched between first current instructions Id(0) and Iq(0) and second current instructions Id(i) and Iq(i) for each control cycle T, current change ΔIb expressed by the aforementioned equation (2) occurs in DC current Ib passing through battery B. That is, DC current Ib oscillates in the change width of ΔIb in synchronizing with control cycle T. By actively oscillating DC current Ib, heat generation of the internal resistance is facilitated, whereby the temperature of battery B can quickly be increased.

Contrasted with the change in DC current Ib as described above, torque instruction value TR of AC motor M1 is always maintained at a constant value T_com irrespective of the switching of current instructions Id* and Iq*. Thus, drivability is ensured since the output torque is maintained at a constant value irrespective of the execution of the temperature increasing means.

Figure 7:
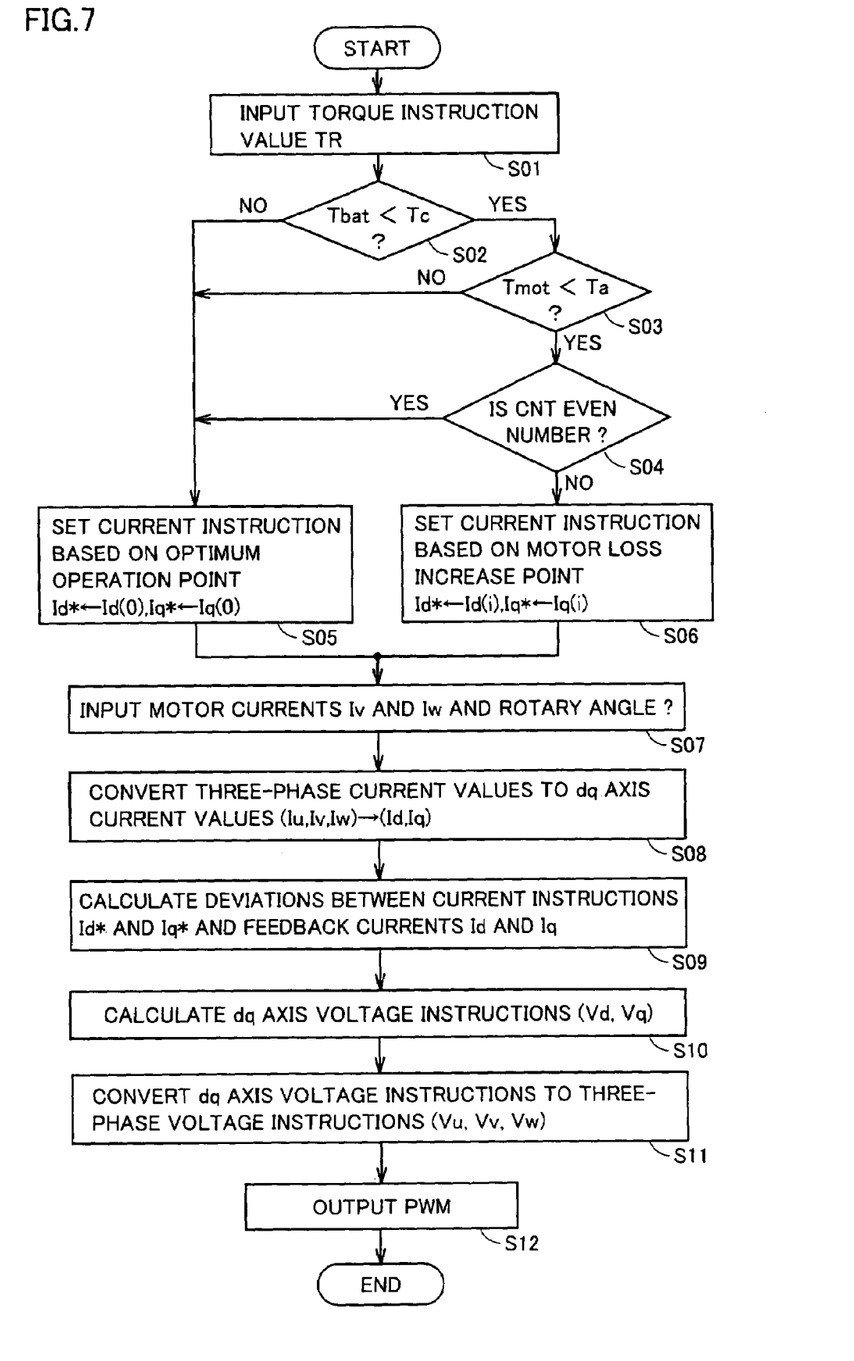
FIG. 7 is a flowchart for showing an operation of increasing the temperature of a battery according to the present invention.

FIG. 7 is a flowchart for showing an operation of increasing the temperature of the battery according to the present invention.

Referring to FIG. 7, when a series of operations is started, current instruction converting portion 410 receives torque instruction value TR from an external ECU (step S01). Further, current instruction converting portion 410 receives battery temperature Tbat from temperature sensor 28 and receives motor temperature Tmot from temperature sensor 26. Then, current instruction converting portion 410 determines whether or not battery temperature Tbat is lower than threshold value Tc (step S02). Threshold value Tc is set to battery temperature Tbat where the power that can be input to or output from battery B starts to decrease significantly.

When it is determined that battery temperature Tbat is lower than threshold value Tc in step S02, current instruction converting portion 410 subsequently determines whether or not motor temperature Tmot is lower than allowable temperature Ta (step S03).

When it is determined that motor temperature Tmot is lower than allowable temperature Ta in step S03, current instruction converting portion 410 switches the control mode of AC motor M1 for each control cycle according to the following steps S04-S06.

Specifically, current instruction converting portion 410 determines whether or not count value CNT from counter 426 is an even number (step S04). When it is determined that count value CNT is an even number, that is, when it is determined that the control cycle is an even-numbered control cycle, current instruction converting portion 410 outputs first current instructions Id(0) and Iq(0) being set based on optimum operation point A as current instructions Id* and Iq* to subtractors 412 and 414 (step S05).

When it is determined that count value CT is an odd number, that is, when it is determined that the control cycle is an odd-numbered control cycle, current instruction converting portion 410 outputs second current instructions Id(i) and Iq(i) being set based on motor loss increase point B as current instructions Id* and Iq* to subtractors 412 and 414 (step S06).

The operation of switching the current instructions of steps S04-S06 is basically repeated until battery temperature Tbat becomes equal to or higher than threshold value Tc. It should be noted that the operation is prohibited in step S03 in response to motor temperature Tmot becoming equal to or higher than allowable temperature Ta.

On the other hand, when it is determined that battery temperature Tbat is equal to or higher than threshold value Tc in step S02, or when it is determined that motor temperature Tmot is equal to or higher than the allowable temperature in step S03, current instruction converting portion 410 does not perform the current instruction switching of steps S04-S06, and it outputs current instructions Id* and Iq* fixed to first current instructions Id(0) and Iq(0) to subtractors 412 and 414, respectively (step S05).

When three phase/two phase converting portion 424 receives motor currents Iv and Iw from current sensor 24 and receives rotary angle θ from resolver 30 (step S07), it conducts a three phase to two phase conversion of motor currents Iu, Iv and Iw to current values Id and Iq passing through d axis and q axis, using rotary angle θ (step S08). Then, three phase/two phase converting portion 424 outputs the converted current values Id1 and Iq1 to subtractors 412 and 414, respectively.

When subtractors 412 and 414 receives current instructions Id* and Iq* from current instruction converting portion 410 and current values Id and Iq from three phase/two phase converting portion 424, respectively, they calculate deviations between the values and output them to PI control portions 416 and 418 (step S09).

PI control portion 416 and 418 calculate voltage manipulation quantities Vd and Vq for adjusting motor currents, employing PI gain to the deviations between current instructions Id* and Iq* and current values Id1 and Iq1, and output the calculated voltage manipulation quantities Vd and Vq to two phase/three phase converting portion 420 (step S10).

Two phase/three phase converting portion 420 performs two phase/three phase conversion of voltage manipulation quantities Vd and Vq from PI control portions 416 and 418 using rotary angle θ from resolver 30, to calculate voltage manipulation quantities Vu, Vv and Vw to be applied to the three-phase coil of AC motor M1 (step S11).

PWM generating portion 422 generates signal PWMI based on voltage manipulation quantities Vu, Vv and Vw and voltage Vm from voltage sensor 13, and outputs the generated signal PWMI to inverter 14 (step S12).

Then, inverter 14 drives AC motor M1 by turning on/off NPN transistors Q3-Q8 based on signal PWMI, whereby AC motor M1 generates requested torque T_com specified by torque instruction value TR.

Further, when battery temperature is lower than threshold value Tc and motor temperature Tmot is lower than allowable temperature Ta, by driving AC motor M1 so that an energy loss is increased or reduced while outputting the requested torque, electric power change ΔP corresponding to the change ΔL in the copper loss is cyclically charged in or discharged from battery B. As a result, the internal resistance of battery B generates heat, whereby the temperature of battery B is increased.

As described above, the secondary battery control apparatus according to the present invention repeatedly charges and discharges battery B by cyclically increasing or reducing the energy loss of AC motor M1, so that the internal resistance is heated by the current passing through battery B and the battery temperature is directly increased from the inside. Accordingly, the temperature can effectively be increased, as compared to a conventional battery control apparatus which charges or discharges a battery in accordance with a state of the vehicle.

Further, since output torque is always maintained at constant torque, drivability can be ensured despite the execution of the temperature increasing means.

Switching of control modes of AC motor M1 by inverter control circuit 410 can be performed by the method other than the operation of alternately switching between two operation points being set in advance as described referring to FIG. 4, which will be disclosed as modifications in the following.

First Modification

Figure 8:
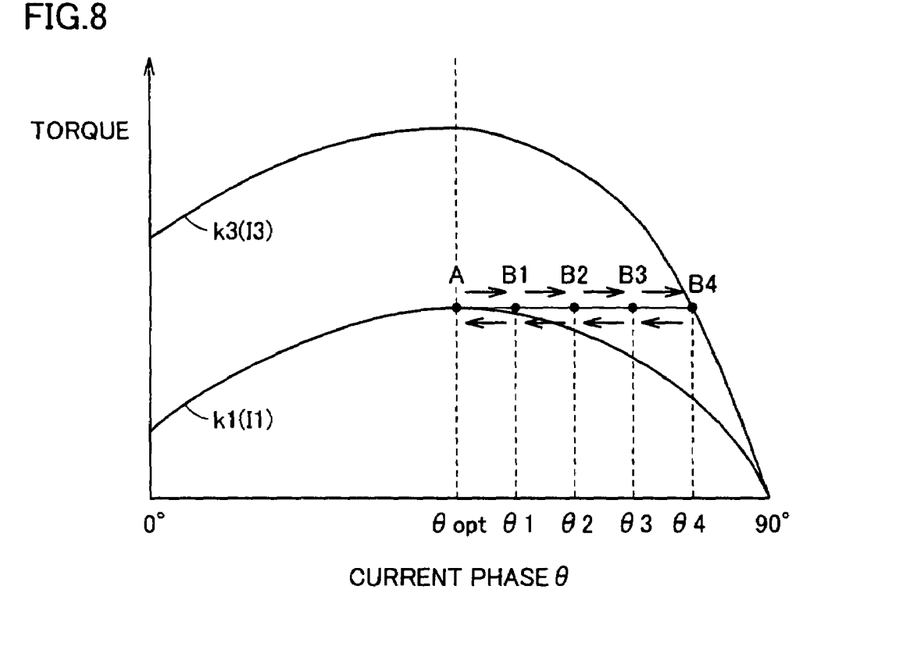
FIG. 8 is an illustration for showing control of an AC motor according to a first modification of the embodiment of the present invention.

FIG. 8 is an illustration for showing control of AC motor M1 according to a first modification of the embodiment of the present invention.

Referring to FIG. 8, AC motor M1 according to the first modification is characterized in having, as operation points, above-described optimum operation point A and a plurality of motor loss increase points B1-B4 with the same output torque as optimum operation point A.

Specifically, each of motor loss increase points B1-B4 is set such that the phase difference between current phase θopt of optimum operation point A is gradually increased from current phase θ1 toward current phase θ4. That is, motor loss increase point B1 having the smallest phase difference has the smallest energy loss, while motor loss increase point B4 having the greatest phase difference has the greatest energy loss.

When battery temperature Tbat is lower than threshold value Tc, inverter control circuit 410 switches among the operation points of AC motor M1 in order of optimum operation point A1—motor loss increase points B1-B2-B3-B4, so that the energy loss gradually changes.

Thus, the energy loss is gradually increased or reduced as the operation points are switched. As a result, reduction in the operation efficiency of AC motor M1 due to sharp increase or reduction in the copper loss can be suppressed.

Second Modification

Figure 9:
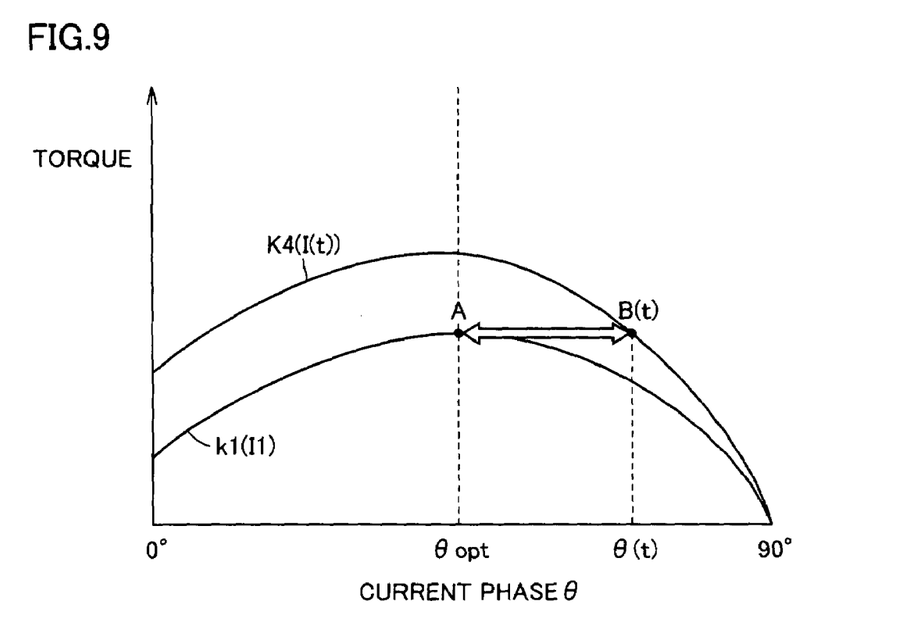
FIG. 9 is an illustration for showing control of an AC motor according to a second modification of the embodiment of the present invention.

FIG. 9 is an illustration for showing control of AC motor M1 according to a second modification of the embodiment of the present invention.

Referring to FIG. 9, AC motor M1 has, as operation points, above-described optimum operation point A and a motor loss increase point B(t) with the same output torque as optimum operation point A.

Inverter control circuit 401 according to the present modification is characterized in setting motor loss increase point B(t) such that, in addition to maintaining output torque at the requested torque, electric power P supplied from battery B to AC motor M1 becomes equal to or lower than the electric power Wout that can be output from battery B (hereinafter also referred to as the battery output).

Specifically, when AC motor M1 is driven at the motor loss increase point, as compared to electric power P taken away from battery B when AC motor M1 is driven at optimum operation point A, electric power change ΔL corresponding to copper loss increase ΔP is additionally taken away. That is, at the motor loss increase point, total of P+ΔP electric power is taken away from battery B. When electric power P+ΔP exceeds battery output Wout of battery B, a problem may occur that battery B is damaged by the excessively great power output.

On the other hand, in battery B, battery output Wout generally tends to be reduced as battery temperature Tbat is reduced.

Therefore, current instruction converting portion 410 retains the relationship between battery temperature Tbat and battery output Wout as a map in advance. When current instruction converting portion 410 reads battery output Wout corresponding to battery temperature Tbat received from temperature sensor 28, it sets amplitude I(t) and current phase θ(t) of motor loss increase point B(t) such that electric power change ΔP becomes at most the read battery output Wout. That is, current instruction converting portion 410 sets amplitude I(t) such that the following equation (4) is satisfied.

$$P+\Delta P=P+R \cdot I(t)^2-R \cdot I1^2 \leq W\text{out} \tag{4}$$

Then, current instruction converting portion 410 sets, as current phase θ(t), the current phase with which requested output T_com is obtained at the amplitude I(t) of the motor current being set.

Therefore, according to the second modification, the temperature of battery B can quickly be increased while battery B is protected from input/output of excessively great electric power.

It should be understood that the embodiment disclosed herein is illustrative and non-restrictive in every respect. The scope of the present invention is defined by the terms of the claims, rather than the description, and is intended to include any modifications within the scope and meaning equivalent to the terms of the claims.

INDUSTRIAL APPLICABILITY

The present invention is applicable to a secondary battery control apparatus incorporated in a vehicle.

The invention claimed is:

1. An apparatus for controlling a secondary battery, comprising:
a motor driving circuit receiving supply of electric power from a secondary battery to drive a motor;

battery temperature obtaining means for detecting or estimating a battery temperature of said secondary battery; and a control circuit controlling said motor driving circuit such that output torque of said motor conforms to requested torque, wherein said control circuit includes first control means for operating said motor at a first operation point that requires a motor driving current of a first current amplitude for generating said requested torque, second control means for operating said motor at a second operation point that requires a motor driving current of a second current amplitude greater than said first current amplitude for generating said requested torque, and switching means for alternately switching between said first control means and said second control means for execution, when said battery temperature is lower than a prescribed threshold temperature, said first control means exerts feedback control of said motor driving current using a first current instruction that is constituted of said first current amplitude and a first current phase and that provides said first operation point, said second control means exerts feedback control of said motor driving current using a second current instruction that is constituted of said second current amplitude and a second current phase and that provides said second operation point, and said switching means alternately switches between said first current instruction and said second current instruction in the feedback control of said motor driving current.

2. An apparatus for controlling a secondary battery, comprising:

a motor driving circuit receiving supply of electric power from a secondary battery to drive a motor; battery temperature obtaining means for detecting or estimating a battery temperature of said secondary battery;

a control circuit controlling said motor driving circuit such that output torque of said motor conforms to requested torque, wherein said control circuit includes first control means for operating said motor at a first operation point that requires a motor driving current of a first current amplitude for generating said requested torque, second control means for operating said motor at a second operation point that requires a motor driving current of a second current amplitude greater than said first current amplitude for generating said requested torque, and switching means for alternately switching between said first control means and said second control means for execution, when said batten temperature is lower than a prescribed threshold temperature; and motor temperature obtaining means for obtaining a motor temperature of said motor, and wherein said control circuit prohibits execution of said switching means in response to said motor temperature becoming at least a prescribed allowable temperature.

3. The apparatus for controlling the secondary battery according to claim 2, wherein said control circuit further includes setting means for setting said second current amplitude such that electric power supplied from said secondary battery to said motor driving circuit does not exceed electric power that can be output from said secondary battery, when said motor is operated at said second operation point.

4. The apparatus for controlling the secondary battery according to claim 3, wherein said setting means sets said second current amplitude based on a relationship, obtained in advance, between said battery temperature and electric power that can be output from said secondary battery and in accordance with electric power that can be output from said secondary battery that corresponds to said battery temperature.

5. The apparatus for controlling the secondary battery according to claim 2, wherein said control circuit further includes setting means for setting a plurality of said second current amplitudes so as to be each greater than said first current amplitude and to be each gradually increased.

6. The apparatus for controlling the secondary battery according to claim 2, wherein said first operation point includes an optimum operation point where a maximum value of output torque in said first current amplitude is said requested torque, and said control circuit exerts feedback control of said motor driving current using said first current instruction providing said optimum operation point, in response to said battery temperature becoming at least said threshold temperature.

7. The apparatus for controlling the secondary battery according to claim 2, wherein said motor includes a motor for driving that drives driving wheels of a vehicle.

8. A method of controlling a secondary battery supplying electric power to a motor driving circuit driving a motor, comprising:

a battery temperature obtaining step of detecting or estimating a battery temperature of said secondary battery; and a driving control step of controlling said motor driving circuit such that output torque of said motor conforms to requested torque, wherein said driving control step includes a first control step of operating said motor at a first operation point that requires a motor driving current of a first current amplitude for generating said requested torque, a second control step of operating said motor at a second operation point that requires a motor driving current of a second current amplitude greater than said first current amplitude for generating said requested torque, and a switching step of switching between said first control step and said second control step for execution, when said battery temperature is lower than a prescribed threshold temperature, said first control step includes a step of exerting feedback control of said motor driving current using a first current instruction that is constituted of said first current amplitude and a first current phase and that provides said first operation point, said second control step includes a step of exerting feedback control of said motor driving current using a second current instruction that is constituted of said second current amplitude and a second current phase and that provides said second operation point, and said switching steps includes a step of alternately switching between said first current instruction and said second current instruction in the feedback control of said motor driving current.

9. A method of controlling a secondary batten supplying electric power to a motor driving circuit driving a motor, comprising:
- a battery temperature obtaining step of detecting or estimating a battery temperature of said secondary battery;
- a driving control step of controlling said motor driving circuit such that output torque of said motor conforms to requested torque,
wherein said driving control step includes
- a first control step of operating said motor at a first operation point that requires a motor driving current of a first current amplitude for generating said requested torque,
- a second control step of operating said motor at a second operation point that requires a motor driving current of a second current amplitude greater than said first current amplitude for generating said requested torque, and
- a switching step of switching between said first control step and said second control step for execution, when said battery temperature is lower than a prescribed threshold temperature; and
- a motor temperature obtaining step of obtaining a motor temperature of said motor,
wherein said driving control step prohibits execution of said switching step in response to said motor temperature becoming at least a prescribed allowable temperature.

10. The method of controlling the secondary battery according to claim 9, wherein
said driving control step further includes a setting step of setting said second current amplitude such that electric power supplied from said secondary battery to said motor driving circuit does not exceed electric power that can be output from said secondary battery, when said motor is operated at said second operation point.

11. The method of controlling the secondary battery according to claim 10, wherein
said setting step sets said second current amplitude based on a relationship, obtained in advance, between said battery temperature and electric power that can be output from said secondary battery and in accordance with electric power that can be output from said secondary battery that corresponds to said battery temperature.

12. The method of controlling the secondary battery according to claim 9, wherein
said driving control step further includes a setting step of setting a plurality of said second current amplitudes so as to be each greater than said first current amplitude and to be each gradually increased.

13. The method of controlling the secondary battery according to claim 9, wherein
said first operation point includes an optimum operation point where a maximum value of output torque in said first current amplitude is said requested torque, and
said driving control step exerts feedback control of said motor driving current using said first current instruction providing said optimum operation point, in response to said battery temperature becoming at least said threshold temperature.

14. The method of controlling the secondary battery according to claim 9, wherein
said motor includes a motor for driving that drives driving wheels of a vehicle.

* * * * *